Patented Nov. 20, 1928.

1,692,787

UNITED STATES PATENT OFFICE.

GUSTAV PISTOR, OF BITTERFELD, AND ERNST BORSBACH, OF BITTERFELD-SANDERSDORF, GERMANY, ASSIGNORS TO I. G. FARBENINDUSTRIE AKTIENGESELLSCHAFT, OF FRANKFORT-ON-THE-MAIN, GERMANY.

METHOD OF PURIFYING GASES CONTAINING PHOSPHORUS.

No Drawing. Application filed December 8, 1925, Serial No. 74,158, and in Germany February 6, 1925.

This invention relates to the manufacture of phosphorus, phorsphorus pentoxide and phosphoric acid. It is well known that, to produce phosphorus, phorphorus pentoxide and phosphoric acid, phosphoric compounds, mixed with suitable reducing agents, are heated in a suitable furnace, preferably by means of electric energy. A raw gas mixture escapes from the furnace containing phosphorus vapours and dust. This dust is to be removed before the phosphorus is condensed or burnt.

Dust-absorbing chambers of the ordinary type have been inserted between the furnace and the condenser or the combustion chamber, but this arrangement has proved insufficient. Furthermore it has been proposed to pass the raw gases directly through a dust-separating chamber the temperature of which is kept above the dew-point of phosphorus, the said chamber being provided with means for electrically separating the dust.

By further experiments we have found that by constructing the dust-separating chambers in the form of real filter-chambers, the purification of the raw gases is improved to such an extent that the electric dust separator may be dispensed with or only a substantially reduced type of it is required.

In this case the same requirement is to be met with as in the former case, that is to say the temperature must be permanently kept above the dew-point of phosphorus during the purification of the gases and within the whole filter plant. Should the sensible heat of the waste gases not suffice for this purpose, additional heat may be supplied for instance by burning, after removal of the phosphorus, the carbon monoxide obtained from the furnace, or by introducing electric energy. This may be effected by externally heating the filter-chamber, or preferably by internal electric heating. For this purpose especial heating resistances may be provided, or the filtering material may serve as resistance itself. Thus for instance, when coke is employed as filtering material, it may simultaneously serve as resistance for the electric heating current.

The filtering material may also consist of the other constituents of the charge of the phosphorus furnace, for instance of phosphorite or of the charging mixture. It may be either continuously passed through the filter-chamber, or it may be renewed from time to time.

After use the filtering material is freed from the adhering dust by sifting, and then reused for charging the furnace; the dust may also be returned to the furnace after the admixture of suitable additions and briqueting, or after another binding operation.

The filter material may also be introduced into the chambers in a somewhat moist state, because at temperatures not far above the dew-point of phosphorus, the latter does not yet react with water vapour to a sensible extent. In this manner, by using the charge as filtering material before introducing it into the furnace, an advantageous preliminary drying of a part of the raw material for charging the furnace may take place.

The way the filter-plant is constructed is of little importance; it is only essential that the pipe for drawing off the waste gases from the furnace is enlarged in the filter-plant to a section which taking into consideration the degree of granulation of the filter mass, will suffice to allow the filtration without essentially increasing the pressure of the gases. If desired, a small electric dust-separator may be connected with the filter-chamber as a reserve, however the electric absorber may be wholly dispensed with, provided the dimensions of the filter-chamber plant are sufficiently large.

We claim:—

1. The method of separating the dust from the raw gases escaping from a phosphorus furnace, which comprises passing the said gases through a filter chamber kept at a temperature above the dew-point of phosphorus.

2. The method of separating the dust from the raw gases escaping from a phosphorus furnace, which consists in passing the said gases through a filter chamber kept at a temperature above the dew-point of phosphorus and then through an electric dust-separator.

3. The method of separating the dust from the raw gases escaping from a phosphorus furnace, which comprises passing the said gases through a filter chamber kept at a temperature above the dew-point of phosphorus and filled with constituents of the charge of the furnace.

4. The method of separating the dust from the raw gases escaping from a phosphorus furnace, which comprises passing the said gases through a filter chamber kept at a temperature above the dew-point of phosphorus and filled with the same mixture of raw phosphates, quartz and coke as that which serves for charging the furnace.

5. The method of separating the dust from the raw gases escaping from a phosphorus furnace, which consists in passing the said gases through a filter chamber filled with the same mixture of raw phosphates, quartz and coke as that which serves for charging the furnace, the said mixture being in a moist condition.

In testimony whereof we affix our signatures.

GUSTAV PISTOR.
ERNST BORSBACH.